(12) United States Patent
Oba et al.

(10) Patent No.: US 7,113,398 B2
(45) Date of Patent: Sep. 26, 2006

(54) REMOVABLE STORAGE DEVICE UNIT

(75) Inventors: Koichiro Oba, Kawasaki (JP);
Naotoshi Katahara, Kawasaki (JP);
Susumu Yamashita, Kawasaki (JP);
Takayuki Bitoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/878,068

(22) Filed: Jun. 28, 2004

(65) Prior Publication Data
US 2004/0252408 A1 Dec. 16, 2004

Related U.S. Application Data

(63) Continuation of application No. PCT/JP01/11585, filed on Dec. 27, 2001.

(51) Int. Cl.
*G06F 1/16* (2006.01)

(52) U.S. Cl. .................. 361/685; 345/168; 713/340

(58) Field of Classification Search ........ 361/679–687, 361/724–727; 360/97.02, 97.03, 97.01; 369/75.1, 369/263; 220/378; 248/615; 345/168; 713/340; 364/707, 708
See application file for complete search history.

(56) References Cited

U.S. PATENT DOCUMENTS 4,941,841 A * 7/1990 Darden et al. ............... 361/685
5,703,734 A * 12/1997 Berberich et al. ....... 360/97.02
2001/0028527 A1 10/2001 Bae et al. ................. 360/97.02

FOREIGN PATENT DOCUMENTS

| JP | 1-205784 | 8/1989 |
|---|---|---|
| JP | 3-93087 | 4/1991 |
| JP | 3-80600 | 8/1991 |
| JP | 4-368690 | 12/1992 |
| JP | 7-29363 | 1/1995 |
| JP | 7-311633 | 11/1995 |
| JP | 9-330587 | 12/1997 |
| JP | 11-37198 | 2/1999 |
| JP | 2000-48540 | 2/2000 |
| JP | 2000-277942 | 10/2000 |
| JP | 2001-236751 | 8/2001 |

* cited by examiner

*Primary Examiner*—Hung Van Duong
(74) *Attorney, Agent, or Firm*—Greer, Burns & Crain, Ltd.

(57) ABSTRACT

A casing includes half members coupled with each other. The half members in cooperation define an inner space for containing a storage device. A removable storage device unit is thus established. A guide surface is defined on the casing. The guide surface is related to a predetermined guide located on an enclosure defining an interior space for containing the casing. The guide surface serves to guide movement of the casing with respect to the enclosure. The removable storage device unit can easily be detached from the enclosure without disassembling the enclosure. The removable storage device unit can easily be carried. The user is allowed to utilize the single storage device common to a plurality of or various electronic apparatuses, for example. This enables a facilitated exchange of data between the electronic apparatuses.

20 Claims, 5 Drawing Sheets

REMOVABLE STORAGE DEVICE UNIT

This is a continuation of International PCT Application No. PCT/JP01/11585, filed Dec. 27, 2001.

BACKGROUND OF THE INVENTION

1. Field of the Invention

The present invention relates to a storage device such as a hard disk drive (HDD) incorporated in a computer, a digital audio apparatus, a game machine, a navigation system, and any other electronic apparatus.

2. Description of the Prior Art

Hard disk drives are recently employed in various products. Different products need the hard disk drives of different capability, different characteristics, different storage capacity, and so on. The hard disk drives are in general redesigned depending on the specifications of each product. This change in the design induces much labor and cost.

For example, a hard disk drive is contained within an enclosure in an electronic apparatus such as a computer. In general, the hard disk drive cannot be removed from the computer unless the enclosure is disassembled. The user cannot utilize the hard disk drive commonly for different products. The user cannot utilize the hard disk drive for the exchange of data between different products.

SUMMARY OF THE INVENTION

It is accordingly an object of the present invention to provide a storage device commonly utilized for various products without a large change in the design.

According to the present invention, there is provided a removable storage device unit comprising: a storage device; a casing including half members coupled with each other, the half members in cooperation defining an inner space for containing the storage device; and a guide surface related to a predetermined guide located on an enclosure defining an interior space for containing the casing, the guide surface serving to guide movement of the casing with respect to the enclosure.

The removable storage device unit can easily be detached from the enclosure without disassembling the enclosure. In addition, the removable storage device unit can easily be carried. The user is allowed to utilize the single storage device common to a plurality of or various electronic apparatuses, for example. This enables a facilitated exchange of data between the electronic apparatuses.

Moreover, the existing storage device can be employed to realize the removable storage device unit of the kind. The storage device is prevented from suffering from a change in design. The removable storage device unit can thus be provided at a lower cost.

The removable storage device unit may further comprise a packing interposed between the half members to completely surround the inner space of the casing. The packing serves to ensure the airtightness of the casing. The inner space of the casing can reliably be isolated from the outside. The storage device within the inner space can sufficiently be protected from humidity, moisture, or the like. In particular, the disposition of a humidifying agent in the inner space reinforces the protection over the storage device against humidity. A higher resistance to humidity serves to increase the application of the storage device.

A casing unit may be provided for a storage device. The casing unit may comprise: a casing including half members coupled with each other, the half members in cooperation defining an inner space for containing the storage device; a guide surface related to a predetermined guide located on an enclosure defining an interior space for containing the casing, the guide surface serving to guide movement of the casing with respect to the enclosure; a first connector located in the inner space of the casing; a second connector attached to the casing outside the inner space of the casing; and a flexible printed wiring board connecting the first connector to the second connector.

The existing storage device can be located within the casing unit. The first and second connectors in combination with the flexible printed wiring board serve to establish an electric connection between the storage device within the inner space and the enclosure containing the removable storage device unit. In this case, the existing storage device can be prevented from suffering from a change in design. This promotes the utilization of the existing storage device.

Here, the flexible printed wiring board may be interposed between packings when the half members are coupled with each other. The packings of the type serve to reinforce the airtightness of the inner space. Electric connections can be established between the inside and outside of the casing without losing the airtightness of the inner space.

The removable storage device unit may further comprise at least pair of elastic or shock absorbing members located between the half members within the inner space of the casing. The storage device may be held between the elastic members within the inner space of the casing. The elastic members allow the storage device of various size and types to be easily contained within the casing. The elastic members serve to reliably fix any one of the storage devices having various size and shapes. In this case, elastic members may be prepared to independently correspond to any of the storage devices having various size and shapes, so that a simple exchange of the elastic members may be required to fit any one of the storage devices having various size and shapes into the casing.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
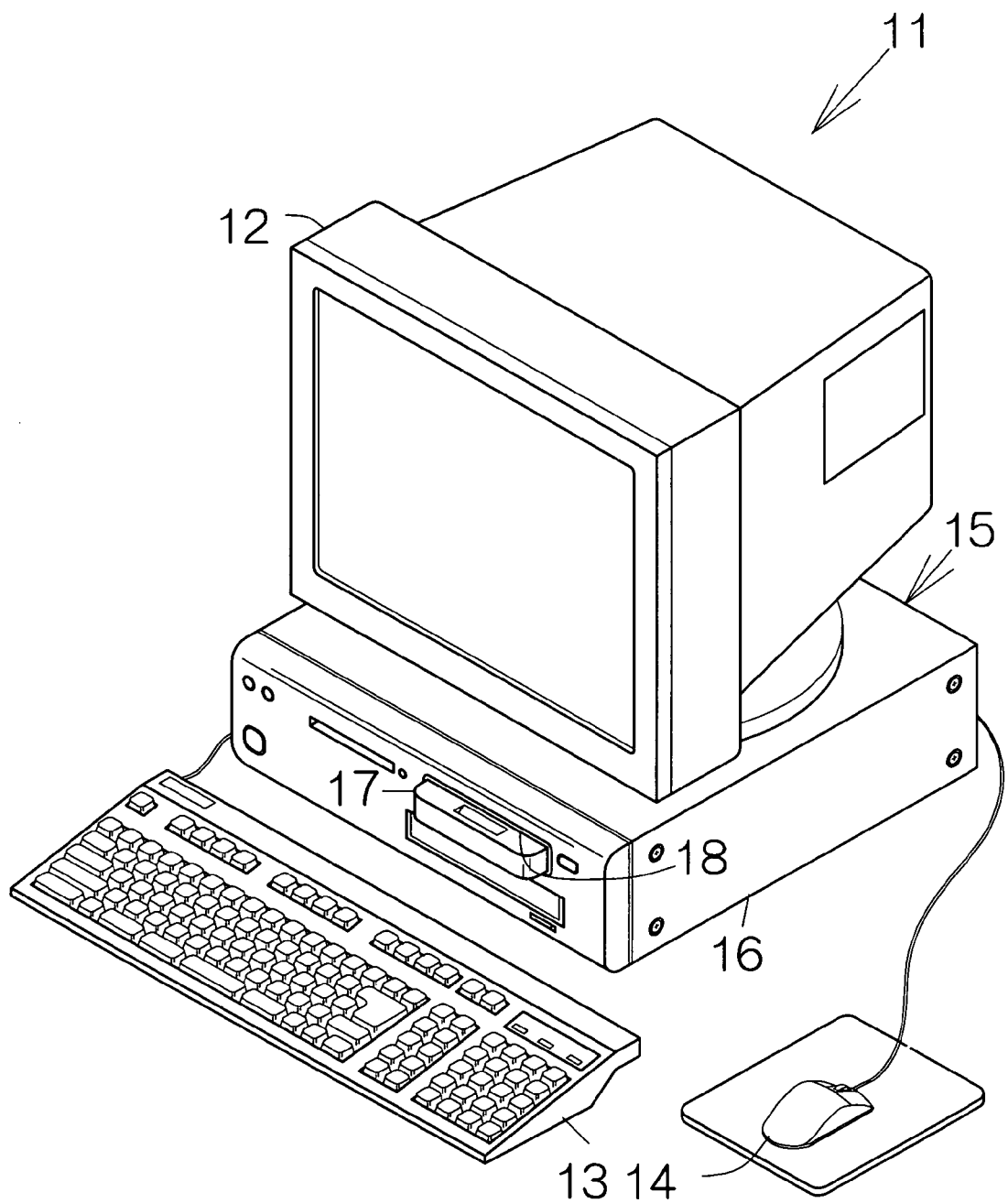
FIG. 1 is a perspective view illustrating a desktop computer system as a specific example of an electronic apparatus.

FIG. 1 illustrates a desktop computer system 11 as a specific example of an electronic apparatus. A display apparatus 12 and input devices such as a keyboard 13, a mouse 14, and the like are connected to a computer 15 in the desktop computer system 11. The display apparatus 12 is allowed to display a predetermined picture on a screen based on an image signal supplied from the computer 15. The keyboard 13 and mouse 14 allows the user to input specific instructions and data into the computer 15.

The computer 15 includes an enclosure 16 defining an interior space for containing at least a central processing unit (CPU), for example. An opening 18 is defined in the front panel of the enclosure 16. The opening 18 is designed to receive the insertion of a removable storage device unit or removable hard disk drive (HDD) unit 17. As is apparent from FIG. 1, the removable HDD unit 17 can be inserted into the enclosure 16 through the opening 18. The removable HDD unit 17 may allow the front end thereof to remain protruding from the front panel of the enclosure 16 as shown in FIG. 1.

Figure 2:
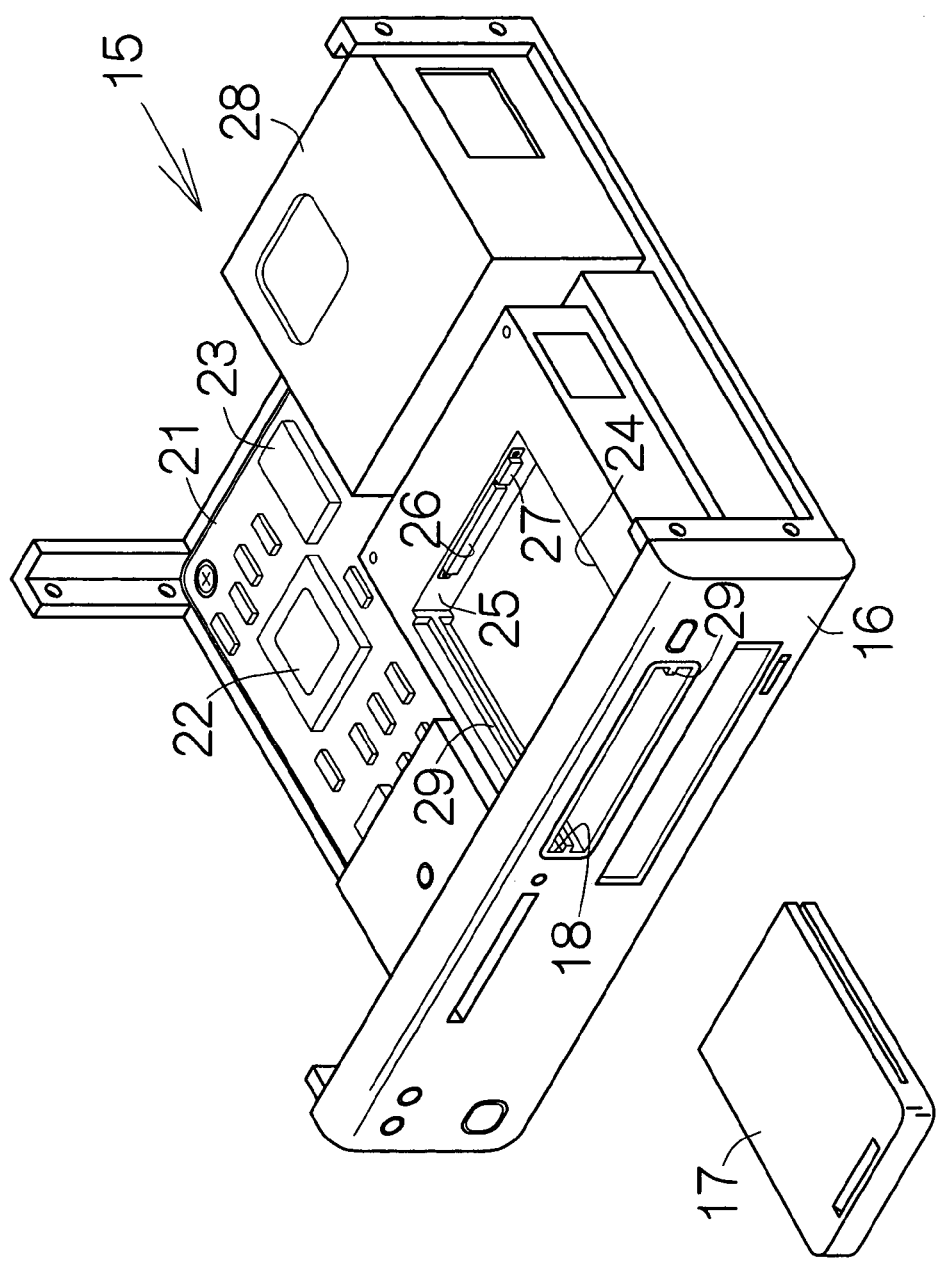
FIG. 2 is an exploded partial perspective view illustrating the inner structure of a computer.

As shown in FIG. 2, a motherboard 21 is contained within the enclosure 16 of the computer 15. A CPU 22, a memory 23, and the like are mounted on the motherboard 21. The CPU 21 executes various software programs such as an operating system (OS) and application software programs, utilizing a storage area of the memory 23.

A HDD mount bay unit 24 is also contained within the enclosure 16. When the removable HDD unit 17 is received on the HDD mount bay unit 24 within the enclosure 16, the rear end of the removable HDD unit 17 is opposed to the penetralia wall surface 25 of the HDD mount bay unit 24. Connectors 26, 27 are fixed to the penetralia wall surface 25 for exchange of data and supply of power. The connector 27 is connected to a power supply unit 28. The motherboard 21, the connector 27, and other components are allowed to receive an electric power from the power supply unit 28. A pair of guide rails 29 are formed on the HDD mount bay unit 24. The guide rails 29 are designed to extend along a horizontal plane from the opening 18 to the penetralia wall surface 25. Each of the guide rails 29 serves as a guide of the present invention.

Figure 3:
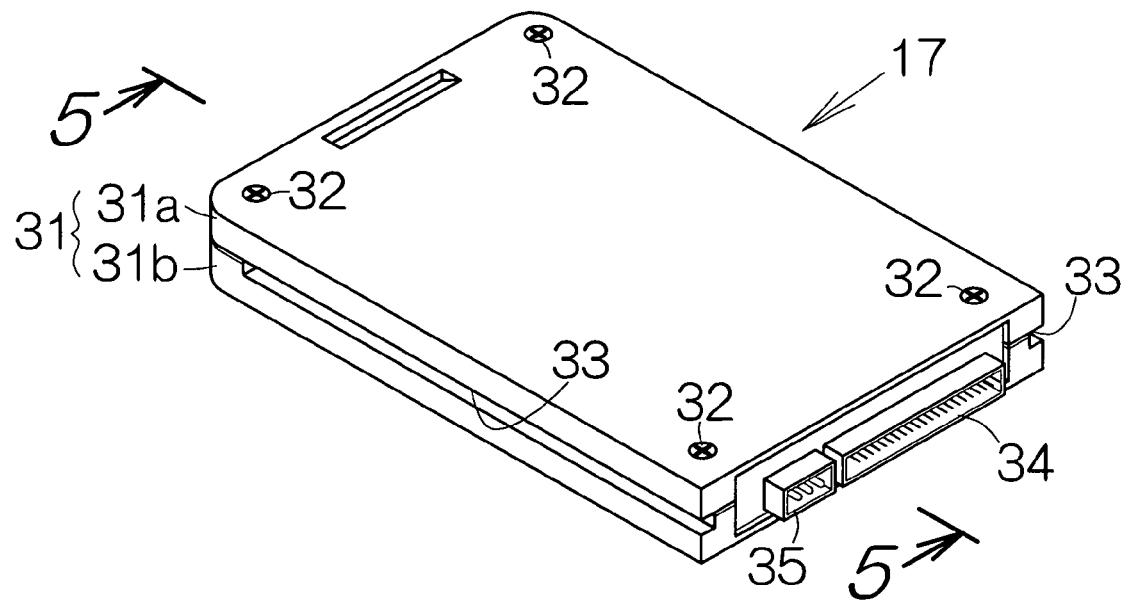
FIG. 3 is a perspective view illustrating a removable hard disk drive (HDD) unit according to a first embodiment of the present invention.

FIG. 3 illustrates the removable HDD unit 17 according to a first embodiment of the present invention. The removable HDD unit 17 includes a casing 31. The casing 31 includes upper and lower half members 31a, 31b. The upper and lower half members 31a, 31b are fixedly coupled with each other with coupling members such as screws 32, for example.

Guide grooves 33 are formed on the casing 31. The guide grooves 33 are designed to extend from the front end to the rear end of the removable HDD unit 17 along respective parallel straight lines. Each of the guide grooves 33 defines a guide surface of the present invention. When the removable HDD unit 17 is inserted through the opening 18 of the enclosure 16, the respective guide grooves 33 receive the corresponding guide rails 29 of the HDD mount bay unit 24. The guide rails 29 thus serve to guide in this manner the insertion and removal of the removable HDD unit 17 relative to the HDD mount bay unit 24. Specifically, the guide grooves 33 serve to guide movement of the casing 31 relative to the enclosure 16. It should be noted that any other guiding mechanism may be employed in place of the combination of the guide grooves 33 and the guide rails 29.

Connectors 34, 35 are fixed to the rear end of the removable HDD unit 17 for exchange of data and supply of power. The connectors 34, 35 get exposed at the exterior surface of the casing 31. When the rear end of the removable HDD unit 17 reaches the penetralia of the HDD mount bay unit 24, the connectors 34, 35 of the removable HDD unit 17 are respectively coupled to the corresponding connectors 26, 27 on the HDD mount bay unit 24. The coupled connectors 34, 26 in this manner establish a transmission path for data. The coupled connectors 35, 27 likewise establish a transmission path for electric power.

Figure 4:
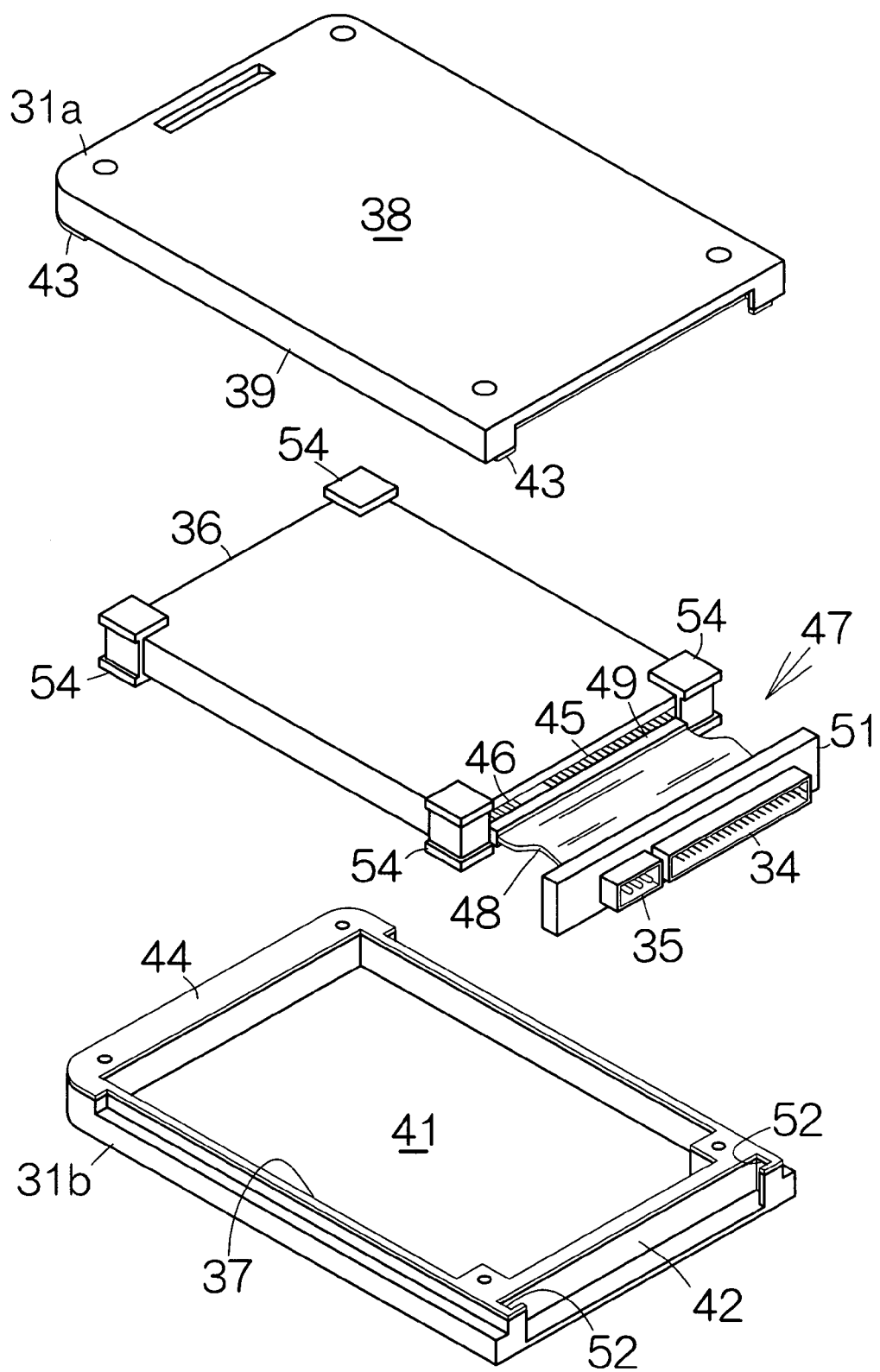
FIG. 4 is an exploded view illustrating the inner structure of the removable HDD unit.

As shown in FIG. 4, an inner space 37 is defined for a hard disk drive (HDD) 36 between the upper and lower half members 31a, 31b coupled with each other. The upper half member 31a includes a flat top plate 38 setting off the upper end of the inner space 37, and a surrounding wall 39 standing from the back surface of the top plate 38 for completely surrounding the inner space 37. The lower half member 31b likewise includes a flat bottom plate 41 setting off the lower end of the inner space 37, and a surrounding wall 42 standing from the front surface of the bottom plate 41 for completely surrounding the inner space 37. The top surfaces of the surrounding walls 39, 42 are contacted with each other so as to form the closed inner space 37.

The HDD 36 includes a storage medium or media such as one or more hard disks contained within its housing. Magnetic information is recorded on the hard disks. The HDD 36 also includes a spindle motor driving the hard disks, a head utilized to read and write magnetic information from and into the hard disks, an actuator arm supporting the head, a voice coil motor driving the actuator arm, and other components, contained likewise within the housing.

An elastic packing 43 is attached to the top surface of the surrounding wall 39 of the upper half member 31a. An elastic packing 44 is likewise attached to the top surface of the surrounding wall 42 of the lower half member 31b. The packings 43, 44 may be made of rubber or resin, for example. An adhesive may be employed to fix the packings 43, 44 to the upper and lower half members 31a, 31b, for example. The respective packings 43, 44 endlessly surround the inner space 37. It should be noted that at least one of the packings 43, 44 should be attached to the corresponding one of the half members 31a, 31b.

A relay connector unit 47 is attached to external connectors 45, 46 of the HDD 36. The relay connector unit 47 includes a flexible printed wiring board 48. The flexible printed wiring board 48 is interposed between the upper and lower half members 31a, 31b when the upper and lower half members 31a, 31b are coupled with each other. The flexible printed wiring board 48 is held between the surrounding walls 39, 42 of the upper and lower half members 31a, 31b. One end of the flexible printed wiring board 48 is located within the inner space 37 while the other end of the flexible printed wiring board 48 is located outside the inner space 37.

A first connector 49 is attached to the inside end of the flexible printed wiring board 48. The first connector 49 is coupled with the external connectors 45, 46 of the HDD 36. The first connector 49 is located within the inner space 37 when the upper and lower half members 31a, 31b are coupled with each other. On the other hand, the aforementioned connectors 34, 35 serving as second connectors are attached to the outside end of the flexible printed wiring board 48. The connectors 34, 35 are located outside the inner space 37 when the upper and lower half members 31a, 31b are coupled with each other. Terminal pins of the first connector 49 are electrically connected to corresponding terminal pins of the connectors 34, 35 through wiring patterns extending on the flexible printed wiring board 48. A transmission path is thus established for exchange of data between the HDD 36 and the connector 34. Likewise, a transmission path is established for electric power between the HDD and the connector 35. The casing 31 and the relay connector unit 47 in combination form a casing unit according to the present invention.

The connectors 34, 35 on the relay connector unit 47 are supported on an attachment plate 51 at the outside end of the flexible printed wiring board 48. The opposite lateral ends of the attachment plate 51 are inserted or fitted into corresponding grooves 52 defined on the upper and lower half members 31a, 31b, for example, so that the connectors 34, 35 are reliably prevented from dropping off from the casing 31 in the removable HDD unit 17 when the upper and lower half members 31a, 31b are coupled with each other. The grooves 52 serve to prevent a relative movement between the attachment plate 51 and the casing 31. The connectors 34, 35 are thus fixedly supported on the casing 31.

Elastic or shock absorbing members 54 are attached to the HDD 36. The elastic members 54 are located at four corners of the HDD 36. The elastic members 53 may be made of rubber or resin, for example. The elastic members 53 are interposed between the upper half member 31a and the HDD 36 as well as between the lower half member 31b and the HDD 36 when the upper and lower half members 31a, 31b are coupled with each other. The HDD 36 is prevented from directly contacting the casing 31. The elastic members 54 serve to protect the HDD 36 from impact and vibration transmitted from the casing 31.

Figure 5:
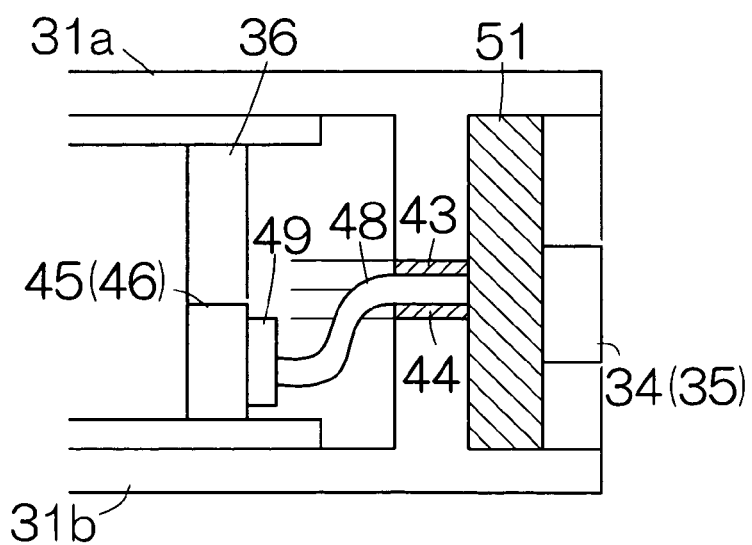
FIG. 5 is a partial cross-sectional view taken along the line 5—5 in FIG. 3, for particularly illustrating a flexible printed wiring board interposed between elastic packings.

As is apparent from FIG. 5, the flexible printed wiring board 48 is interposed between the packings 43, 44 when the upper and lower half members 31a, 31b are coupled with each other. This interposal of the flexible printed wiring board 48 between the packings 43, 44 serves to airtightly isolate the inner space 37 of the casing 31 when the upper and lower half members 31a, 31b are coupled with each other. It should be noted that one of the packings 43, 44 may not completely surround the inner space 37 on the upper and lower half members 31a, 31b. In this case, at least one of the packings 43, 44 may have an extent enough to completely contact the flexible printed wiring board 48 on the surrounding wall 39, 42.

The removable HDD unit 17 can be detached from the electronic apparatus in a facilitated manner without disassembling the enclosure 16. In addition, the removable HDD unit 17 can easily be carried. The user is allowed to utilize the single HDD 36 common to a plurality of or various electronic apparatuses, for example. This enables a facilitated exchange of data between the electronic apparatuses.

Moreover, the existing HDD 36 can be employed to realize the removable HDD unit 17. The HDD 36 is prevented from suffering from a change in design. The removable HDD unit 17 can thus be provided at a lower cost.

The existing HDD 36 may include any size or kinds of HDD in addition to a HDD of 2.5 inches or 3.5 inches, for example. The elastic members 54 serve to reliably fix any one of the HDDs 36 within the inner space 37 even if the HDDs 36 have various size and shapes. In this case, the elastic members 54 should be prepared to independently correspond to any of the HDDs 36 of various size and shapes, so that a simple exchange of the elastic members 54 may be required to fit any one of the HDDs 36 having various size and shapes into the casing 31.

Figure 6:
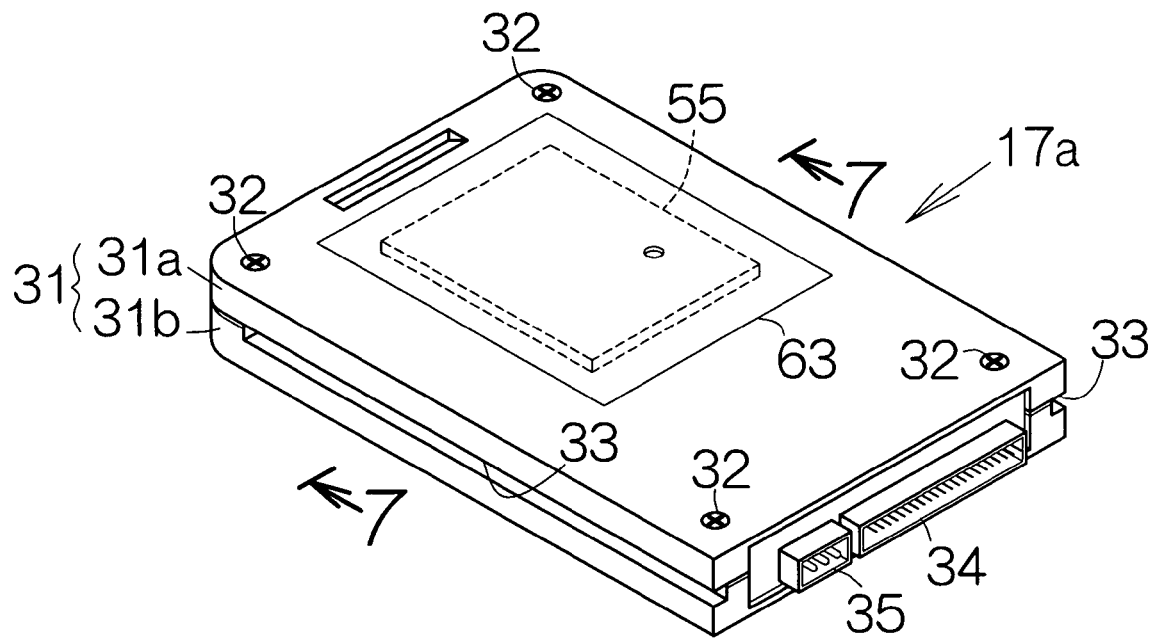
FIG. 6 is a perspective view illustrating a removable HDD unit according to a second embodiment of the present invention.

FIG. 6 illustrates the removable HDD unit 17a according to a second embodiment of the present invention. The removable HDD unit 17b of the second embodiment includes a dehumidifying agent disposed within the inner space 37 of the casing 31. A dehumidifying agent unit 55 is employed to realize the disposition of the dehumidifying agent. The dehumidifying agent unit 55 is mounted on the upper half member 31a. Like reference numerals are attached to structure or components equivalent to those of the aforementioned first embodiment.

Figure 7:
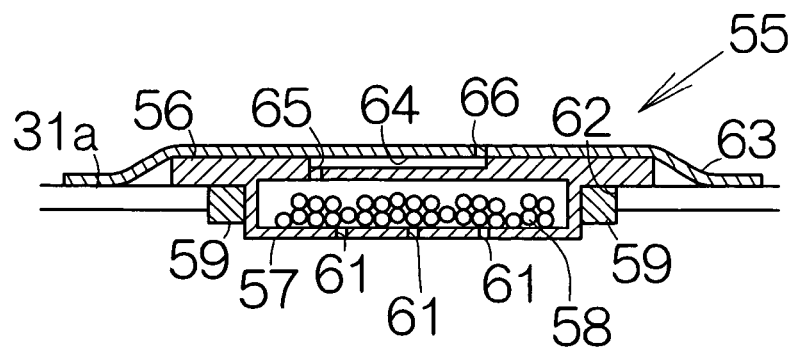
FIG. 7 is a partial cross-sectional view taken along the line 7—7 in FIG. 6, for particularly illustrating the structure of a dehumidifying agent unit.

As is apparent from FIG. 7, the dehumidifying agent unit 55 includes a base plate 56 superposed on the top plate 38 of the upper half member 31a. An agent box 57 is integrally formed on the base plate 56. Particles of dehumidifying agent 58 are located within the agent box 57. An endless rubber packing 59 is fitted around the agent box 57. The rubber packing 59 is designed to completely surround the agent box, 57. A plurality of small through holes 61 are defined in the agent box 57. Air is exchanged between the interior and exterior of the agent box 57, namely, between the interior of the agent box 57 and the interior of the casing 31, through the through holes 61.

On the other hand, an opening 62 is defined in the top plate 38 of the upper half member 31a. The opening 62 is designed to receive the agent box 57 of the dehumidifying agent unit 55. When the agent box 57 is inserted into the opening 62, the base plate 56 is allowed to contact the outer surface of the upper half member 31a. The rubber packing 59 is interposed between the agent box 57 and the inner surface of the opening 62. A sufficient airtightness can in this manner be established around the agent box 57. The elasticity of the rubber packing 59 serves to tightly fix the agent box 57 in the opening 62. The dehumidifying agent unit 55 can thus be prevented from dropping off from the casing 31. Moreover, the replacement of the dehumidifying agent units 55 can be simplified.

In addition, as is apparent from FIGS. 6 and 7, a label seal 63 may be adhered to the outer surface of the upper half member 31a. The label seal 63 is designed to cover all over the base plate 56 of the dehumidifying agent unit 55. The label seal 63 serves to reinforce the airtightness of the casing 31. In this case, an air passage 64 may preferably be defined between the outer surface of the base plate 56 and the label seal 63. The air passage 64 may have a predetermined length. A groove is formed on the outer surface of the base plate 56. When the label seal 63 is adhered to the outer surface of the base plate 56, the groove establishes the air passage 64. A through hole 65 is formed in the base plate 56 at an end of the groove. A through hole 66 is also formed in the label seal 63. This through hole 66 is positioned right at the other end of the groove. Air can in this manner be exchanged between the interior of the agent box 57 and the outside of the casing 31. The air passage 64 allows the pressure inside the casing 31 to follow changes in the pressure outside the casing 31.

The dehumidifying agent 58 serves to dehumidify the inner space 37 inside the casing 31 in the removable HDD unit 17. The dehumidifying agent 58 realizes a reliable protection of the HDD 36 from the humidity in combination with the airtightness achieved by the aforementioned packings 43, 44.

The removable HDD unit 17, 17a may be utilized in, in addition to the aforementioned desktop computer system 11, a digital audio apparatus, a game machine, a navigation system, and any other electronic apparatus. In addition, a tiny through hole may be defined in the casing 31 of the removable HDD unit 17 so as to moderate a difference in the pressure between the interior and exterior of the casing 31. The tiny through hole of this type cannot completely negate the airtightness of the casing 31.

What is claimed is:

1. A removable storage device unit comprising:
   a storage device;
   a casing including half members coupled with each other, the half members in cooperation defining an inner space for containing the storage device; and
   a guide surface integrally formed on one of the half members, the guide surface serving to guide movement of the casing with respect to an enclosure.

2. The removable storage device unit according to claim 1, further comprising:
   a packing interposed between the half members to completely surround the inner space of the casing.

3. The removable storage device unit according to claim 1, wherein a dehumidifying agent is disposed in the inner space of the casing.

4. The removable storage device unit according to claim 1, further comprising at least a pair of elastic members located between the half members within the inner space of the casing, the storage device being held between the elastic members within the inner space of the casing.

5. The removable storage device unit according to claim 1, wherein the storage device has a housing accommodating a recording medium.

6. The removable storage device unit according to claim 2, further comprising:
   a first connector connected to an external connector of the storage device in the inner space of the casing;
   a second connector attached to the casing outside the inner space of the casing;
   a flexible printed wiring board connecting the first connector to the second connector; and
   a second packing located between the half members, the flexible printed wiring board being interposed between the packing and the second packing.

7. The removable storage device unit according to claim 2, wherein the half members have surrounding walls for defining the inner space, the packaging being attached to top surfaces of the surrounding walls.

8. The removable storage device unit according to claim 6, wherein a dehumidifying agent is disposed in the inner space of the casing.

9. The removable storage device unit according to claim 6, further comprising at least a pair of elastic members located within the inner space of the casing, the storage device being held between the elastic members within the inner space of the casing.

10. The removable storage device unit according to claim 7, wherein the surrounding walls are all of a substantially uniform height, except for a portion configured to allow passage of a relay connector unit.

11. A casing unit for a storage device comprising:
    a casing including half members coupled with each other, the half members in cooperation defining an inner space for containing the storage device;
    a first connector located in the inner space of the casing;
    a second connector attached to the casing outside the inner space of the casing;
    a flexible printed wiring board connecting the first connector to the second connector; and
    a guide surface integrally formed on one of the half members, the guide surface serving to guide movement of the casing with respect to an enclosure.

12. The casing unit according to claim 11, further comprising:
    a packing interposed between the half members to completely surround the inner space of the casing.

13. The casing unit according to claim 11, wherein a dehumidifying agent is disposed in the inner space of the casing.

14. The casing unit according to claim 11, further comprising at least a pair of elastic members located within the inner space of the casing, the storage device being held between the elastic members within the inner space of the casing.

15. The casing unit according to claim 11, further comprising:
    a pair of packings located between the half members, the flexible printed wiring board being interposed between the packings.

16. The casing unit according to claim 11, wherein the half members have surrounding walls for defining the inner space, the surrounding walls are all of a substantially uniform height, except for a portion configured to allow passage of a relay connector unit.

17. The casing unit according to claim 15, wherein at least one of the pair of packings completely surrounds the inner space of the casing.

18. The casing unit according to claim 15, further comprising at least a pair of elastic members located within the inner space of the casing, the storage device being held between the elastic members within the space of the casing.

19. The casing unit according to claim 15, wherein the half members have surrounding walls for defining the inner space, the surrounding walls are all of a substantially uniform height, except for a portion configured to allow passage of a relay connector unit.

20. The casing unit according to claim 17, wherein a dehumidifying agent is disposed in the inner space of the casing.

* * * * *